June 16, 1931.  G. L. VILFORDI  1,809,951
TRAVELING HEATED AND COOLED FOOD CARRIER
Filed Feb. 24, 1931   2 Sheets-Sheet 2
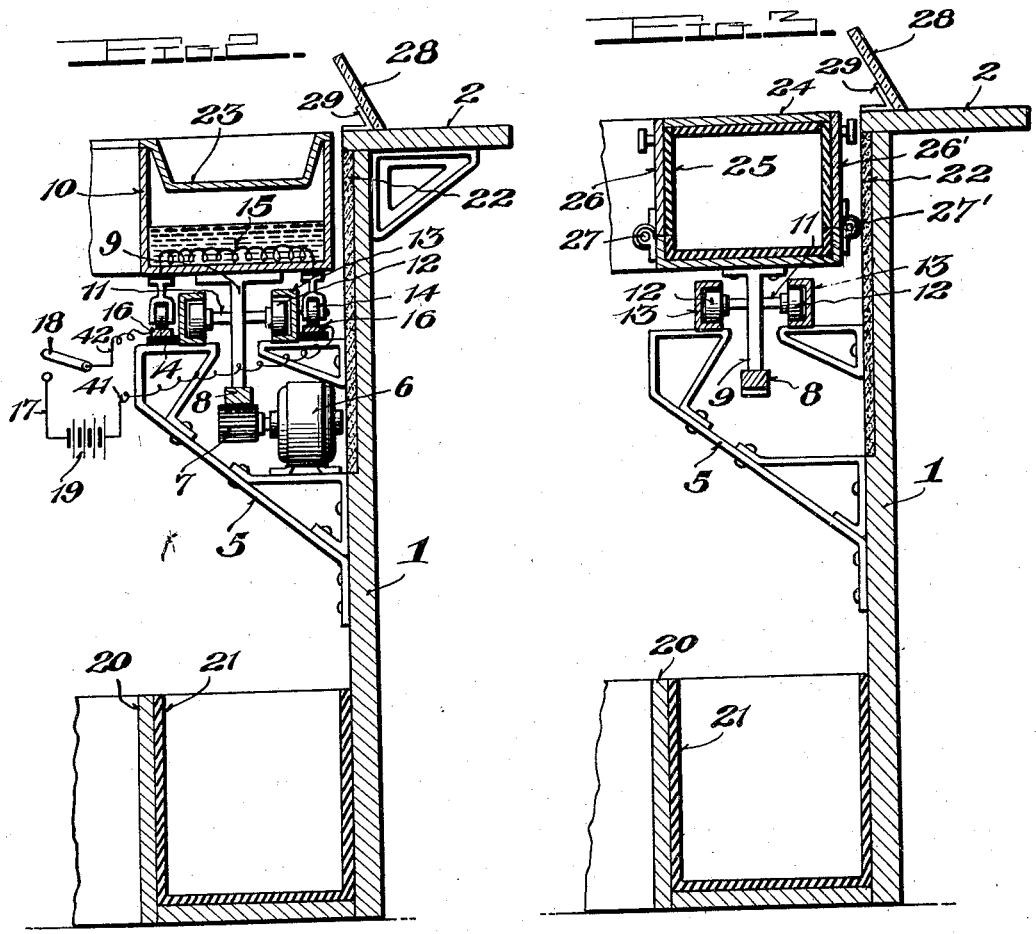
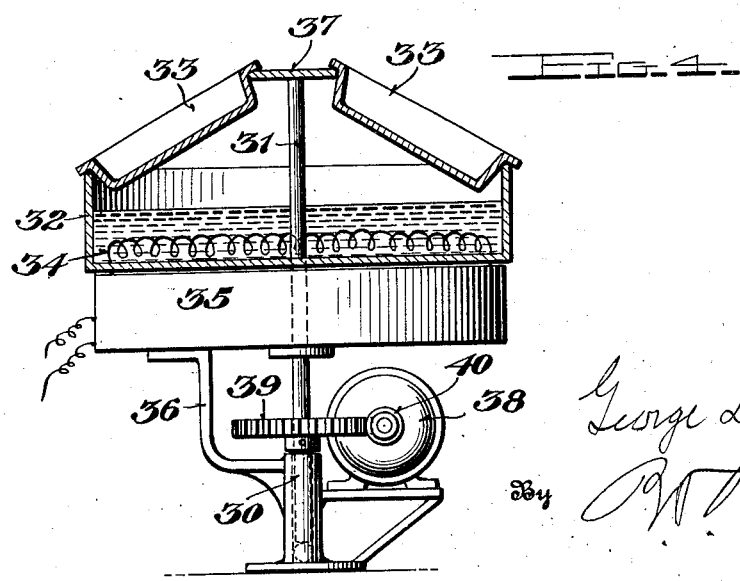

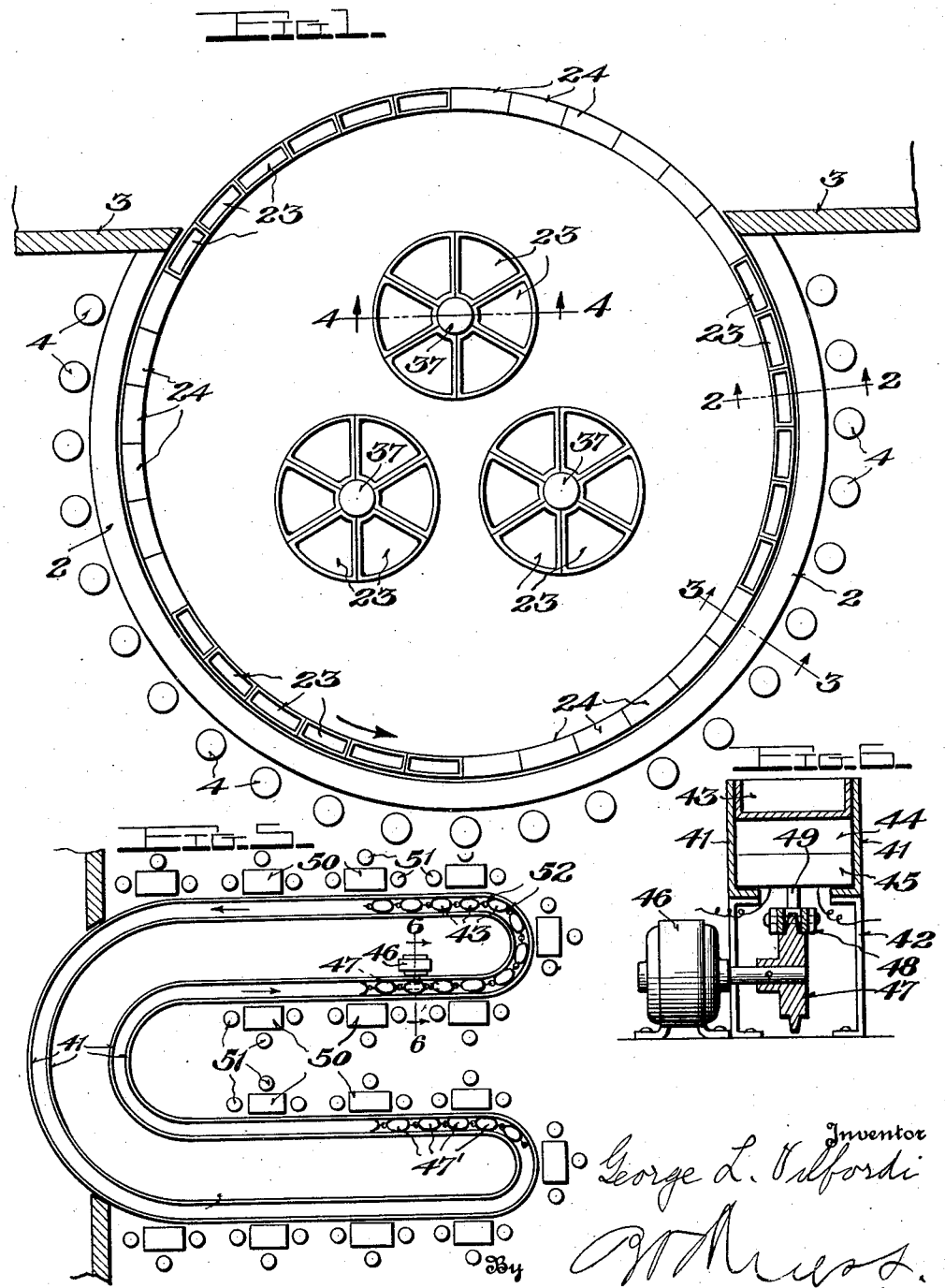

Patented June 16, 1931

1,809,951

UNITED STATES PATENT OFFICE

GEORGE LUIGI VILFORDI, OF DALLAS, TEXAS, ASSIGNOR OF TWENTY-FIVE PER CENT TO METODI PETROFF AND FIFTEEN PER CENT TO JOHN BUTERA, BOTH OF DALLAS, TEXAS

TRAVELING HEATED AND COOLED FOOD CARRIER

Application filed February 24, 1931. Serial No. 518,017.

This invention relates to traveling heated and cooled food carriers and more particularly relates to a carrier of this type wherein the food is placed on the carrier in the kitchen and is then conveyed to the dining room.

The primary object of the invention is to provide a carrier of this type which has improved means for maintaining the food pans either hot or cold and which further embodies novel means for disposing of the used dishes and cutlery and for returning same to the kitchen by means of the carrier.

The invention has further and other objects which will be later set forth and manifested in the course of the following description.

In the drawings:

Fig. 1 is a top plan view of the invention showing the wall between the kitchen and dining room in section;

Figs. 2, 3, and 4 are enlarged sections on the lines 2—2, 3—3, and 4—4 respectively of Fig. 1;

Fig. 5 is a view similar to Fig. 1 of a modified form of the invention; and

Fig. 6 is an enlarged section on line 6—6 of Fig. 5.

In proceeding in accordance with the present invention a curved vertically disposed wall 1 is employed which has a correspondingly curved counter 2 secured to its top, these parts extending outwardly from the kitchen wall 3 into the dining room. The counter 2 affords a table readily accessible to the seats 4 which latter extend in a correspondingly curved manner about the counter 2. A bracket 5 of any suitable form is secured to the inner side of the wall 1 and has an electric motor 6 secured thereto. The shaft of the motor is provided with a pinion 7 which latter is beneath a circular rack 8, the teeth of which are in mesh with the teeth of the pinion. The rack 8 is mounted upon arms 9 which depend from a series of water carrying pans 10. The arms 9 are preferably equipped with transverse shafts 11 on the ends of which rollers 12 are journaled, the rollers operating within tracks 13 that are secured to the upper face of the bracket 5.

Contact rollers 14 are carried by the pans in depending relation thereto, while the ends of an electrical heating coil 15 which is mounted in each pan is connected to the rollers 14. The rollers 14 ride on curved contact strips 16 which are secured to the top of the bracket, the contact strips being insulated from the brackets and are included in a circuit having a switch 18 which receives current from any suitable source of supply 19. The bottom of the wall 1 has a used dish compartment 20 extending inwardly of the wall, the compartment preferably being lined with an elastic material such as rubber indicated at 21 while the upper side of the wall is provided with asbestos 22 so as to insulate the heat from the water pans in relation to the patrons. The tops of the water pans are open and receive therein food pans 23.

Referring to Fig. 1 of the drawings, it will be seen that the food pans are in series with used dish receptacles 24 which latter also are preferably lined with rubber 25 and have doors 26 and 26' mounted on spring hinges 27. The water receptacles 10 alternate with the used dish receptacles, there preferably being six water receptacles followed by six used dish receptacles. Mounted on the upper face of the counter 2 is a curved guard 28 secured by brackets 29 which guard may be made of glass and is inclined toward the counter so as to protect the customers against steam etc., which rises from the food pans.

It will be understood that the attendant stands within the open center of the ring like carrier and within the latter there are a series of separate food pan carriers each composed of a stand 30 provided with a vertical shaft 31 upon which is mounted a water receptacle 32. Within the water receptacle there are a series of inclined pans 33 heated by the coil 34, the coil being energized by means similar to that above described and housed within a casing 35 which latter is rigidly connected to the stand 30 by a bracket 36. As shown in Fig. 4 a disk 37 is secured to the top of the shaft 31 on which the rims of the pans 33 rest, the latter being further supported by the vertical wall of the receptacle 32. The shaft 31 is driven by a motor 38 through a gear 39 on the shaft and a pinion 40 on the motor arbor.

In operation it will be understood that the motor 6 is driven at a low rate of speed so that the carrier will correspondingly move slowly, the current going from the battery through wire 41 to one of the contact plates 16 thence through the adjacent contact roller 14, wire 15, the other contact roller 14 and then through the other contact plate 16, wire 42, switch 18 and wire 17 back to the source 19. The water in the receptacles 10 will thus be heated. As the used dishes are removed from the counter same are stored in the receptacle 21 which latter extends throughout the counter. When it is desired to return the used dishes to the kitchen same are removed from the storage compartment 21 and placed within the receptacles 24 through the doors 26 and upon reaching the kitchen are removed through the doors 26'.

Referring to Figs. 5 and 6 of the drawings there are provided two L-shaped spaced track members 41 supported by the frame members 42. Food pans 43 are supported on the water receptacles 44 the latter being heated by the same means, namely the contact plates and rollers of Fig. 2 which is housed within a casing 45. In this form of the invention a motor 46 has a sprocket 47 which drives a chain 48 connected by arms 49 secured to the casings 45. The tracks are of open U formation so that the attendant may stand in the space between the sides of the tracks. Tables 50 and chairs 51 are arranged on the outer sides of the tracks for the patrons. It will be understood that the shape of the tracks may be varied as desired. The various food pans are coupled as indicated at 52 and are of substantially elliptical form so as to readily traverse the curves at the ends of the U track structure.

Obviously, the receptacles 10 may be filled with ice so as to maintain the food cool, if desired, in which event of course the switch 18 will be opened.

It will be understood that the dish receptacles corresponding to 25 in Fig. 3 are also employed in Fig. 5 as indicated at 47'.

It will be seen that since the dishes are placed in the dish receptacles from the inner side of the conveyor and in the dining room that when the receptacles reach the kitchen same may be removed through the rear doors of the receptacles.

What is claimed is:

1. In a device of the type described, a frame, a pair of spaced tracks, water receptacles having open tops, food pans received in the receptacles, a heating coil in each receptacle, arms depending from the receptacles into the space between the tracks, transverse shafts carried by the arms and having rollers which ride on the tracks, a pair of horizontal contact plates on the frame disposed on the outer sides of the respective tracks, contact means carried by the water receptacles and depending therefrom, and having connection with the respective ends of the heating coils and also having wiping engagement with the contact plates, means engaging the arms to effect travel of the water receptacles, and a circuit including said contact plates.

2. In a device of the type described, a frame, a pair of spaced tracks, water receptacles having open tops, food pans received in the receptacles, a heating coil in each receptacle, arms depending from the receptacles, means engaging the arms to effect travel of the water receptacles on the tracks, a pair of horizontal contact plates on the frame disposed on the outer sides of the respective tracks, contact means carried by the water receptacles and depending therefrom and having connection with the respective ends of the heating coil and also having wiping engagement with the contact plates, and a circuit including said contact plates.

3. In combination with a wall separating a kitchen and dining room and having an opening, an endless conveyor movable through the opening, and dish receptacles carried by the conveyor, said dish receptacles having dish receiving openings at their fronts and rears whereby dishes may be placed in the receptacles through the front openings thereof and may be removed through the rear openings thereof when the receptacles reach the kitchen.

4. In a device of the type set forth, a vertical wall, a counter extending outwardly from one side of the wall, a food carrier on the opposite side of the wall, guard means extending from the rear of the counter upwardly and over the food carrier, and means to actuate the carrier.

5. In a device of the type set forth, a vertical wall, a counter extending outwardly from one side of the wall, a food and dish receptacle carrier on the opposite side of the wall, a stationary dish holding compartment beneath the carrier and vertically aligned therewith, and means to actuate the carrier.

6. In a device of the type set forth, a water receptacle having an open top, a food pan received in the open top of the receptacle, a heating coil in the receptacle, spaced contact plates beneath the receptacle, tracks between the contact plates, rollers connected to the receptacle and riding on the tracks, means to move the receptacle, contact means carried by the receptacle and depending therefrom and having connection with the respective ends of the heating coil and also having wiping engagement with the contact plates and a circuit including said contact plates.

7. In combination with a wall separating a kitchen and dining room and having an opening, an endless conveyor movable through the opening, dish receptacles carried by the conveyor and having doors at their front and rear sides whereby dishes may be placed in the receptacles through the front doors thereof and in the dining room and may be removed through the rear doors when the receptacles reach the kitchen.

In testimony whereof I affix my signature.

GEORGE LUIGI VILFORDI.